(12) United States Patent
Bauer et al.

(10) Patent No.: US 6,716,958 B1
(45) Date of Patent: Apr. 6, 2004

(54) WAVEGUIDE SYSTEMS OR STRUCTURES OR PARTS THEREOF, CONTAINING POLYCYANATE COPOLYMERS PREPARED FROM POLYFUNCTIONAL CYANATES AND FLUORINATED MONOCYANATES

(75) Inventors: Monika Bauer, Senzig (DE); Jörg Bauer, Senzig (DE); Christian Dreyer, Niederwoerresbach (DE); Norbert Keil, Berlin (DE); Crispin Zawadzki, Berlin (DE)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 10/019,447

(22) PCT Filed: Jul. 3, 2000

(86) PCT No.: PCT/EP00/06203

§ 371 (c)(1),
(2), (4) Date: May 6, 2002

(87) PCT Pub. No.: WO01/02464

PCT Pub. Date: Jan. 11, 2001

(30) Foreign Application Priority Data

Jul. 1, 1999 (EP) ............................................. 99112596

(51) Int. Cl.$^7$ ................................................ C08G 79/00
(52) U.S. Cl. ....................................... 528/422; 385/123
(58) Field of Search ............................ 528/422; 385/123

(56) References Cited

U.S. PATENT DOCUMENTS 5,089,660 A * 2/1992 Murray et al.
5,165,959 A    11/1992 Burack et al.
5,208,892 A     5/1993 Burack et al.
5,536,765 A *  7/1996 Papathomas
5,780,159 A     7/1998 Bauer et al.

FOREIGN PATENT DOCUMENTS

EP    581 268 A1    2/1994

OTHER PUBLICATIONS

Arthur A. Snow et al., "Fluoromethylene Cyanate Ester Resins. Synthesis, Characterization, and Fluoromethylene Chain Length Effects", Macromolecules, 30, pp. 394–405 (1997).

* cited by examiner

*Primary Examiner*—Rachel Gorr
(74) *Attorney, Agent, or Firm*—Finnegan, Henderson, Farabow, Garrett & Dunner, L.L.P.

(57) ABSTRACT

The present invention is directed to wave guide systems or structures or parts thereof, characterized in that they consist of or comprise a resin composed of at least one polycyanate copolymer, obtainable by copolymerization of at least one specific difunctional cyanate with at least one monocyanate of the formula N≡—C—O—R, wherein R is a straight or branched non-aromatic hydrocarbon radical or a non-aromatic hydrocarbon radical comprising a cyclic structure, the radical having the formula $C(R')_2$—$CFR''_2$ wherein each R' is, independently from the other, hydrogen or fluorine or an optionally substituted, preferably fluorinated alkyl or alkenyl group, and each of R" may independently be defined as R' or may have an arylic structure.

14 Claims, No Drawings

WAVEGUIDE SYSTEMS OR STRUCTURES OR PARTS THEREOF, CONTAINING POLYCYANATE COPOLYMERS PREPARED FROM POLYFUNCTIONAL CYANATES AND FLUORINATED MONOCYANATES

CROSS REFERENCE TO RELATED APPLICATIONS

This application is a national stage filing of International Application No. PCT/EP00/06203, filed Jul. 3, 2000, which published in the English language and claims priority of European Patent Application No. 99112596.4, filed on Jul. 1, 1999.

BACKGROUND OF THE INVENTION

1. Field of the Invention

The present invention is directed to optical elements in the field of waveguide systems or waveguide structures, e.g. arrayed wave guide components, prepared by copolymerization of specific polyfunctional cyanates and fluorinated monocyanates, as well as to the use of said copolymers for the preparation of said structures.

Organic polymers are increasingly interesting materials in the optical or microoptical field, in integrated optics or in microsystem techniques. In these fields, they may be used in optical instruments and apparatuses or parts thereof as well as in special optics as lenses, prisms, for fixation of optical systems, as support material for optical layers and as translucent coating materials for mirrors or lenses. Organic polymers may be used in optical fibres and for the preparation of waveguide structures. Their technical handling is relatively easy, and their density is lower in comparison to glass.

Specifically, if such plastics or organic polymers are to be used as a waveguide, a variety of requirements are to be met. The refractive index of the material should be variable in a range as broad as possible and should be adaptable to that of specific substrates. If used in the optical communication engineering, low absorptions of the materials are required at 1.3 and 1.55 µm. The loss due to attenuation caused by volume defects (non-homogenities, microbubbles, microfissures) should be minimized. Besides specific technological requirements, e.g. preparation of layers and structurability, specific provisions for the use of organic polymers as waveguide structures in integrated optics are the thermal and thermo-mechanical stability, adapted extension coefficients and long term stability of optical properties.

2. Description of the Related Art

Until now, polymethacrylates and polycarbonates have been mainly used for optical purposes. Both classes of polymers have an excellent light transmittance, but their thermal and thermo-mechanical stability is not sufficient due to their chemical structure. Thus, polymethacrylates and polycarbonates cannot practically be used at temperatures exceeding 130° C. which is due to their relatively low glass transition temperatures. In addition, both types of polymers are linear, un-crosslinked polymers. This has the adverse effect that they are partly solubilized in case multilayer-systems are prepared via the application of dissolved components, e.g. by spin-coating each layer. Consequently, the layer structures as obtained are not sufficiently delimitated and neat which, however, is an essential for the preparation of waveguide structures.

There are other high performance polymers which have glass transition temperatures of more than 180° C. Examples are polyarylethersulfones, polyarylsulfones, polyaryletherketones, polyimides and polyetherimides, the processing of which, however, is more difficult than that of polymethacrylates and polycarbonates. Another disadvantage of these systems is the relatively high optical loss at wave lengths of 1.3 and 1.55 µm, relevant in communication engineering.

Polyperfluorocyclobutanes (PFCB) are a relatively new class of high performance polymers. Upon thermal curing they yield unsoluble cross-linked polymers which are characterized by high thermal stability. Waveguide layers prepared from PFCB show very low optical losses of 0.2 dB/cm at 1550 nm.

Also, polycyanurates have been used for the preparation of optical components. U.S. Pat. Nos. 5,208,892 and 5,165,959 describe the preparation of polycyanate resins made of a single monomer (either fluorinated or non-fluorinated). German Offenlegungsschrift DE 44 35 992 A1 describes optical elements prepared from polycyanurate resins. The resins are made by polymerization of dicyanate or polycyanate compounds, optionally in mixture with di- or polyphenols or di- or polyglycidyl compounds. Like polyperfluorocyclobutanes, polycyanurates yield unsoluble cross-linked polymers upon thermal curing, and these polymers are as well characterized by high thermal stability. They are specifically useful due to their excellent adhesional force on a variety of substrates, for example silicon, silica or a variety of organic polymers. Refractive index and glass transition temperature of the cured cross-linked polymers may be varied in broad ranges, due to the easy availability of a great number of di- and mono-functional cyanate monomers which may be copolymerized with each other. Polycyanurates of the kind mentioned above are partly commercially available. Completely cured polycyanurates known in the art which consequently are stable for long terms may have optical losses of about 0.2 dB/cm at 1.3 µm. However, the optical losses are not less than 0.5dB/cm at 1.55 µm which is important in communication engineering technologies.

SUMMARY OF THE INVENTION

The present invention provides copolymers, obtainable by copolymerization of at least one monocyanate, derived from a partly or fully fluorinated alcohol ("fluorinated monocyanate"), and at least one specific difunctional organic cyanate. It has been found that such copolymers are specifically valuable in the preparation of optical waveguide systems or structures thereof having low optical losses at 1.3 and at 1.55 µm.

Throughout the invention, "partly fluorinated" means that at least one fluorine atom is present in the molecule. "Fully fluorinated" means that hydrogen atoms are completely substituted by fluorine atoms. The whole molecules, or single organic radicals or groups (e.g. methyl, methylene, alkyl, aryl groups), respectively, may be fully fluorinated.

DETAILED DESCRIPTION OF THE INVENTION

As fluorinated monocyanate, one, two, three or even more monocyanates of formula I may be used $$N\equiv C-O-R \tag{I}$$

wherein R is $C(R')_2-CFR''_2$, wherein each R' is, independently from the other, hydrogen or fluorine or an optionally substituted, preferably fluorinated alkyl or alkenyl group having preferably 1 to 13, more preferably 3 to 11 carbon atoms. Each of R" may independently be defined as R'. Further, R" may have an arylic structure. Preferably, R is a straight, branched, or cyclic non-aromatic hydrocarbon radical or an non-aromatic hydrocarbon radical comprising a cyclic structure. Preferably, the non-aromatic hydrocarbon radical has 1 to 15, more preferably 3 to 12 carbon atoms. It is to note that each of the carbon atoms of R may carry 1, 2 or, if it is a terminal carbon atom, 3 fluorine atoms. Fully fluorinated carbon atoms (—$CF_3$, —$CF_2$—) are preferred. Further, it is preferred that one or both of R' are hydrogen and/or one of R" is fluorine or a partly or fully fluorinated alkyl and the other is a partly or, more preferable, fully fluorinated alkyl which may be straight, branched or cyclic. Specific examples for the cyanates of formula (I) are —$CH_2$—$CF_2$—$CF_3$, —$CH_2$—$CF_2$—$CF_2$—$CF_3$, —$CH_2$—C($CF_3$)$_2$F, —$CH_2$—$CF_2$—$CF_2$—$CF_3$.

For the preparation of the said copolymer, one, two, three or even more difunctional organic cyanates may be used. The expression "difunctional" means that two NCO groups are present in the molecule. The NCO groups are bound to organic radicals via the oxygen atom. The difunctional cyanate may be, but is not necessarily, partly or fully fluorinated. The organic structure of the difunctional cyanate or cyanates is selected under difunctional cyanates of formula II:

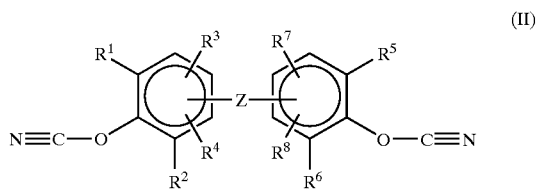

(II)

wherein $R^1$ to $R^4$ and $R^5$ to $R^8$ are independently from each other hydrogen, optionally substituted $C_1$–$C_{10}$ alkyl, $C_3$–$C_8$-cycloalkyl, $C_1$–$C_{10}$-alkoxy, halogen, phenyl or phenoxy, the alkyl or aryl groups being unfluorinated, partly fluorinated or fully fluorinated, Z is a chemical bond, $SO_2$, $CF_2$, $CH_2$, CHF, CH(CH$_3$), isopropylene, hexafluoroisopropylene, n- or iso-$C_1$–$C_{10}$ alkylene which may be partly or fully fluorinated, O, NR$^9$ with R$^9$ being hydrogen or $C_1$–$C_{10}$ alkyl, N=N, CH=CH, C(O)O, CH=N, CH=N—N=CH, alkyloxyalkylene having 1 to 8 carbon atoms which is optionally partly or fully fluorinated, S, or Si(CH$_3$)$_2$. Examples are 2,2'-bis(4-cyanato-phenyl)propane,
2,2'-bis (4-cyanato-phenyl)hexafluoropropane,
biphenylene-4,4'dicyanate,
2,3,5,6,2',3',5',6'octafluorobiphenylene-4,4'-dicyanate.

In one embodiment of the invention, dicyanates according to formula III:

N≡C—O—$R^{10}$—O—C≡N     (III)

wherein $R^{10}$ is an organic non-aromatic hydrocarbon group carrying at least 1 fluorine atom are copolymerized into the polycyanate copolymer useful in the present invention. In formula (III), $R^{10}$ is preferably an alkylene group, more preferably having 3 to 12 carbon atoms. Each of the carbon atoms may carry 0, 1 or 2 or, in the case of a terminal group, 3 fluorine atoms. The carbon chain may be straight or branched or may be cyclic or may contain a cyclic part. Further, it may contain one or more C=C double bonds. In one embodiment, $R^{10}$ is fully fluorinated. Examples are —$CH_2$—$CF_2$—$CF_2$—$CH_2$— or —$CH_2$—$CF_2$—$CF_2$—$CF_2$—$CF_2$—$CH_2$.

In another embodiment of the present invention, at least one additional monocyanate having formula IV:

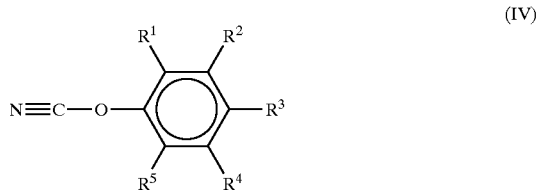

(IV)

wherein $R^1$ to $R^5$ are as previously defined for formula II, is copolymerized in addition to the starting cyanates as defined above (with or without (a) cyanate(s) of formula III) in order to obtain the polycyanate copolymer. Examples for compounds of formula IV are phenylcyanate and perfluorophenylcyanate.

Specifically, the refractive index and the glass transition temperature may be influenced by this additive as desired.

The polycyanate copolymers according to the invention may be obtained by mixing at least one of the monocyanates of formula I, optionally in addition to at least one of formula IV, and at least one difunctional organic cyanate of formula II, optionally in addition to at least one of formula III. The ratio of monocyanates to dicyanates may be freely chosen, provided that at least 1% by mol, preferably at least to 5% by mol, more preferably at least 10% by mol of monocyanate of structure I is present per mol of monomers to be polymerized. Preferably, the monofunctional cyanates of formulas I and IV are present in a molar amount of not more than 75% related to the total amount of moles of monomers present in the mixture to be copolymerized.

The starting monocyanate and dicyanate compounds as described above are preferably warmed up after mixing. The temperature may be chosen as required; a range of about 120° C. to 170° C. is preferred. Preferably, the reaction is performed in the absence of oxygen, e.g. in a sealed and preferably (under an inert gas atmosphere). The mixture is allowed to react until a liquid or viscous prepolymer (resin) is obtained. This prepolymer or resin is soluble in useful solvents, preferably in solvents having high polarity, e.g. ethylethoxyacetate or chlorobenzene. In general, the prepolymer is processed in a respective solution, e.g. by spin-coating of a solution containing 25 to 65% by weight of the prepolymer, more preferably about 50% by weight of the prepolymer. The prepolymer solution may be applied to a suitable substrate, consisting of e.g. silicon, quartz or an organic polymer. After being brought into the desired shape (e.g. a layer of desired thickness) it is cured (e.g. at temperatures in the range of 200° to 260° C.) in order to provide the desired network between the cyanate groups.

If an optical wave guide system comprising a variety of different layers of the present polycyanate copolymers shall be prepared, each different layer is applied and is cured, e.g. thermically cured, before the next layer is applied.

It shall be clear that the term "resin" is independent of the condition of the polymer, e.g. whether it is in a prepolymerized condition or is partly or completely cured.

The polycyanate copolymers according to the present invention have a glass transition temperature in the range of 100° to 300° C., and their refractive index at 1.55 μm may be controlled in the desired range, specifically of from 1.35 to 1.60. Specifically, the more fluorinated monomers are used, or the more fluorine parts per weight are present in the mixture, related to the weight of the mixture to be polymerized, the lower is the refractive index of the polycyanate copolymer obtained.

On the other hand, use of brominated derivatives of the cyanate monomers as defined above will raise the refractive index of the copolymer obtained. Thus, monocyanate compounds of e.g. formula IV wherein at least one of $R^1$, $R^2$, $R^3$, $R^4$ o4 $R^5$ is substituted by bromine, may be advantageously added to the mixture. In general, the more bromine is included in the polymer, the higher is the refractive index obtained. Accordingly, any of the cyanates of formulas I to IV as defined above (with the proviso that those of formula I may be free of fluorine) carrying one or more bromine atoms may be selected. However, brominated monocyanates are preferably used, either alone or in mixture with brominated polycyanates.

The polycyanate copolymers according to the present invention are used for the preparation of optical wave guide systems or parts thereof. For example, they may be used for the preparation of waveguides and waveguide structures. For such structures, use of at least two different polycyanate copolymers is preferred, wherein a polycyanate copolymer having a lower refractive index may be used for buffer and/or cladding while a polycyanate copolymer differing from the first one and having a greater refractive index may be used as the optical waveguide. At least one of these polycyanate copolymers should have been obtained according to the present invention. The selection will be easily made by a skilled person who is able to control the refractive index via the teachings given in this application. The layers show excellent adhesion to each other and to the substrate. Waveguide structures as described above may be prepared by known methods, e.g. RIE (Reactive Ion Etching).

The invention is now further illustrated by way of examples.

EXAMPLE 1

12.9 g of a substituted dicyanate of Bisphenol A (compound II wherein $R^1$–$R^4$ is H, $R^5$–$R^8$ is H, Z is hexafluoroisopropyl) and 3.7 g of a partly fluorinated monocyanate (compound I wherein R is $CH_2$—$CF_2$—$CF_2$—$CF_3$) are heated to 160° C. in a sealed vessel for a time of about four hours. The reaction is terminated before gelling starts, and a clear, pale yellow prepolymer is obtained which is viscous at 160° C. and is solid at room temperature. The prepolymer is brought into solution by mixing it with 50% by weight of ethylethoxyacetate (EEA). Spin-coating of this solution onto a substrate made of silicon wafer yields a layer which may be cured at 240° C. for one hour in a drying oven. The product has a refractive index of 1.4776 at 1.55 μm.

EXAMPLE 2

12.9 g of a substituted dicyanate of Bisphenol A (compound II wherein $R^1$–$R^4$ is H, $R^5$–$R^8$ is H, Z is hexafluoroisopropyl), 3.7 g of a partly fluorinated monocyanate (compound I wherein R is $CH_2$—$CF_2$—$CF_2$—$CF_3$), and 1.3 g of a monocyanate (compound IV wherein $R^1$, $R^2$, $R^4$, $R^5$ are hydrogen and $R^3$ is bromine) are heated to 160° C. in a sealed vessel for a time of about four hours. The reaction is terminated before gelling starts, and a clear, pale yellow prepolymer is obtained which is viscous at 160° C. and is solid at room temperature. The prepolymer is brought into solution by mixing it with 50% by weight of EEA. Spin-coating of this solution onto a substrate made of silicon wafer yields a layer which may be cured at 240° C. for one hour in a drying oven. The product has a refractive index of 1.4870 at 1.55 μm.

EXAMPLE 3

9.7 g of dicyanate of Bisphenol A (compound II wherein $R^1$–$R^4$ is H, $R^5$–$R^8$ is H, Z is isopropyl) and 2.5 g of a fully fluorinated monocyanate (compound I wherein R is $CH(CF_3)_2$) are heated to 140° C. in a sealed vessel for a time of about four hours. The reaction is terminated before gelling starts, and a clear, pale yellow prepolymer is obtained which is viscous at 140° C. and is solid at room temperature. The prepolymer is brought into solution by mixing it with 50 % by weight of EEA. Spin-coating of this solution onto a substrate made of silicon wafer yields a layer which may be cured at 240° C. for one hour in a drying oven. The product has a refractive index of 1.5596 at 1.55 μm.

EXAMPLE 4

9.7 g of a substituted dicyanate of Disphenol A (compound II wherein $R^1$–$R^4$ is H, $R^5$–$R^8$ is H, Z is hexafluoroisopropyl), 10.3 g of a partly fluorinated dicyanate (compound III wherein $R^{10}$ is $CH_2$—$CF_2$—$CF_2$—$CF_2$—$CF_2$—$CH_2$) and 1.1 g of a partly fluorinated monocyanate (compound I wherein R is $CH_2$—$CF_2$—$CF_2$—$CF_3$) are heated to 140° C. in a sealed vessel for a time of about four hours. The reaction is terminated before gelling starts, and a clear, pale yellow prepolymer is obtained which is viscous at 140° C. and is solid at room temperature. The prepolymer is brought into solution by mixing it with 50 % by weight of EEA. Spin-coating of this solution onto a substrate made of silicon wafer yields a layer which is cured at 240° C. for one hour in a drying oven. The product has a refractive index of 1.3689 at 1.55 μm.

EXAMPLE 5

A 50 weight-% solution of the prepolymer of example 1 in EEA is spin-coated onto a silicon wafer, yielding a layer of about 8 μm thickness. Curing is performed at 240° C. in a drying oven for one hour. Onto this layer, a 50 weight-% solution of the prepolymer of example 2 in EEA is spin-coated, again yielding a layer of about 8 μm thickness. Also, this layer is cured at 240° C. in the drying oven for about 1 hour. According to known methods, an aluminum layer of about 100 nm is sputtered onto the said second prepolymer layer followed by its structurization by way of photolithography and chemical etching. Subsequently, the waveguides are structured by aid of oxygen RIE techniques (typical rate 100 nm/min using pure oxygen), and the etching mask is removed by treatment in a chemical etching bath. Then, the upper cladding layer is applied by spin-coating a prepolymer solution of example 1 followed by curing at 240° C. for 1 hour. Using near field technique a difference of 0.0094 of the refractive index between the waveguide and its surrounding is measured. Cut-back measurements of light intensities of waveguides of different lenght yielded a loss of 0.35 dB/cm at 1.55 μm.

What is claimed is:

1. An optical waveguide system or a structure or part thereof, comprising a resin composed of at least one polycyanate copolymer, obtainable by copolymerization of at least one difunctional cyanate of formula II:

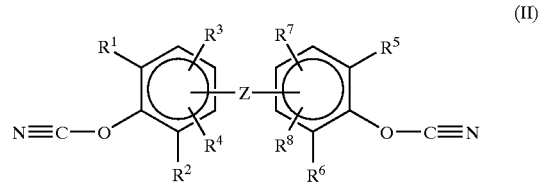

(II)

wherein $R^1$ to $R^4$ and $R^5$ to $R^8$ are independently from each other hydrogen, optionally substituted $C_1$–$C_{10}$ alkyl, $C_3$–$C_8$-cycloalkyl, $C_1$–$C_{10}$-alkoxy, halogen, phenyl or phenoxy, the alkyl or aryl groups being unfluorinated, partly fluorinated or fully fluorinated, Z is a chemical bond, $SO_2$, $CF_2CH_2$, CHF, $CH(CH_3)$, isopropylene, hexafluoroisopropylene, n- or iso-$C_1$–$C_{10}$ alkylene, O, $NR^9$, N=N, CH=CH, C(O)O, CH=N, CH=N—N=CH, alkyl oxyalkylene having 1 to 8 carbon atoms, S, Si(CH$_3$)$_2$, and R$^9$ is hydrogen or C$_1$–C$_{10}$ alkyl with at least one monocyanate of the following formula I:

$$N\equiv C—O—R \qquad (I)$$

wherein R is a straight or branched non-aromatic hydrocarbon radical or a non-aromatic hydrocarbon radical comprising a cyclic structure, the radical having the formula C(R')$_2$–CFR"$_2$ wherein each R' is, independently from the other, hydrogen or fluorine or an optionally substituted alkyl or alkenyl group, and each of R" may independently be defined as R' or may have an arylic structure.

2. An optical waveguide system or a structure or part thereof according to claim 1 wherein the substituted alkyl or alkenyl group of R' is fluorinated.

3. An optical waveguide system or a structure or part thereof according to claim 1, wherein the polycyanate copolymer is obtainable by copolymerization of at least one difunctional cyanate of formula II, at least one monofunctional cyanate of formula I and at least one dicyanate having formula III:

$$N\equiv C—O—R^{10}—O—C\equiv N \qquad (III)$$

wherein R$^{10}$ is a non-aromatic hydrocarbon group carrying at least one fluorine atom.

4. An optical waveguide system or a structure or part thereof according to claim 3, wherein R$^{10}$ of formula III is a partly or fully fluorinated alkylene group having 1 to 15 carbon atoms.

5. An optical waveguide system or a structure or part thereof according to claim 4, wherein the partly or fully fluorinated alkylene group has 3 to 12 carbon atoms.

6. An optical waveguide system or a structure or part thereof according to claim 3, wherein the polycyanate copolymer is obtainable by copolymerization of at least one difunctional cyanate of formula II, at least one monofunctional cyanate of formula I, optionally at least one dicyanate having formula III, and a monocyanate of formula IV

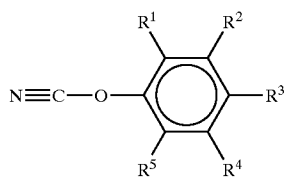

(IV)

wherein R$^1$ to R$^5$ are defined as in formula II.

7. An optical waveguide system or a structure or part thereof according to claim 3, wherein the polycyanate copolymer is obtainable by copolymerization of at least one difunctional cyanate of formula II, at least one monofunctional cyanate of formula I, and at least one brominated monocyanate of formulas I to III, as defined above with the proviso that the brominated monocyanates of formula I may be free of fluorine.

8. An optical waveguide system or a structure or part thereof according to claim 7, wherein the at least one brominated monocyanate is of formula I as defined above with the proviso that the monocyanates of formula I may be free of fluorine.

9. An optical waveguide system or a structure or part thereof according to claim 1, wherein the monocyanate of formula I is used in an amount of at least 10 mol % per mol of the polycyanate copolymer.

10. An optical waveguide system or a structure or part thereof according to claim 1, wherein the monocyanate of formula I is used in an amount of at least 20 mol % per mol of the polycyanate copolymer.

11. An optical waveguide or a structure or part thereof according to claim 1, wherein the polycyanate copolymer has a glass transition temperature of from 100° C. to 300° C. or a refractive index of about 1.35 to about 1.60 at 1.55 μm.

12. An optical waveguide system or a structure or part thereof according to any one of claims 1 to 11, wherein the system, structure or part thereof is an optical fibre, a waveguide, a buffer layer, a cladding or a support for any of said structures.

13. An optical waveguide system comprising a waveguide consisting of a resin as defined in any one of claims 1 to 11, and a buffer or cladding consisting of a resin as defined in any one of claims 1 to 11, but different from the resin of the waveguide, wherein the resin of the waveguide has a greater refractive index than that of the buffer or cladding.

14. An optical waveguide or a structure or part thereof according to claim 1, wherein the polycyanate copolymer has a glass transition temperature of from 100° C. to 300° C. and a refractive index of about 1.35 to about 1.60 at 1.55 μm.

* * * * *

UNITED STATES PATENT AND TRADEMARK OFFICE
CERTIFICATE OF CORRECTION

PATENT NO. : 6,716,958 B1
APPLICATION NO. : 10/019447
DATED : April 6, 2004
INVENTOR(S) : Monika Bauer et al.

It is certified that error appears in the above-identified patent and that said Letters Patent is hereby corrected as shown below:

Claim 7, column 8, lines 5-7, "brominated monocyanate of formulas I to III, as defined above with the proviso that the monocyanates," should read --dicyanate having formula III; wherein at least one of the cyanates of formulas I to III, as defined above is brominated with the proviso that the brominated cyanates--.

Claim 8, col. 8, line 12, "brominated monocyanate" should read --brominated cyanate--.

Signed and Sealed this

Fourteenth Day of August, 2007

JON W. DUDAS
*Director of the United States Patent and Trademark Office*